United States Patent
Schuchardt (10) Patent No.: US 6,260,995 B1
(45) Date of Patent: Jul. 17, 2001

(54) MIXING APPARATUS (75) Inventor: Heinrich Schuchardt, Leverkusen (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 09/227,151

(22) Filed: Jan. 7, 1999

(30) Foreign Application Priority Data

Jan. 14, 1998 (DE) .............................................. 198 01 073

(51) Int. Cl.⁷ .............................. B29B 7/48; B29B 7/20; B01F 7/04
(52) U.S. Cl. ........................... 366/97; 366/300; 366/318; 366/301
(58) Field of Search .................................. 366/97, 96, 81, 366/82, 83, 84, 85, 297, 298, 299, 300, 301, 309, 311, 312, 313; 425/204, 208, 209

(56) References Cited

U.S. PATENT DOCUMENTS

| 4,392,967 | 7/1983 | Alexander . | |
|---|---|---|---|
| 4,556,324 | * 12/1985 | Tynan | 366/301 |
| 5,334,358 | * 8/1994 | Schuchardt et al. | 366/297 |
| 5,399,012 | 3/1995 | Schuchardt et al. | 366/97 |
| 5,505,536 | * 4/1996 | Schuchardt | 366/301 |
| 5,658,075 | * 8/1997 | Schebesta et al. | 366/97 |
| 5,876,115 | 3/1999 | Schebesta et al. | 366/97 |

FOREIGN PATENT DOCUMENTS 19611852   10/1997   (DE) .
0715881    6/1996    (EP) .

* cited by examiner

Primary Examiner—Tony G. Soohoo
(74) Attorney, Agent, or Firm—Norris McLaughlin & Marcus (57) ABSTRACT A description is given of a mixing apparatus for the treatment of viscous substances which comprises a heatable housing 1 with a product inlet 6 on one side of the vessel and a product outlet 8 on the other side of the housing 1 and, if appropriate, an exhaust vapor nozzle 7, which comprises two or more mutually parallel counter-rotating shafts 2, 2'. Located thereupon there are paddles 3, 3' extending in the circumferential direction and blades 4, 4', 5, 5' extending along the axial direction. The apparatus permits the active axial conveyance of the mixed substance, the moving internals fully cleaning themselves kinematically during operation of the apparatus.

10 Claims, 7 Drawing Sheets

MIXING APPARATUS

The invention relates to a mixing apparatus for the treatment of viscous substances, comprising a heatable vessel with a product inlet on one side of the vessel and a product outlet on the other side of the vessel, if appropriate an exhaust vapor nozzle as well as two or more mutually parallel, counter-rotating shafts with, located thereupon, paddles extending in the circumferential direction and blades extending along the axial direction. The apparatus permits the active axial conveyance of the mixed substance, the moving internals fully cleaning themselves kinematically during operation of the apparatus.

In the production and processing of plastics and rubber, high-viscosity liquids, which may contain fine-particle solids, are treated by using process technology. In particular, apparatuses for mixing, evaporating and reacting plastics are required. These mixers or reactors must have a good mixing action, and for example in the case of evaporating volatile components caused by a reaction-induced release, also permit rapid renewal of the free surfaces of the mixer.

For the process-technological treatment of viscous products, apparatuses which have both as large a free volume as possible (defined as the ratio of product volume to interior housing volume and as good kinematic self-cleaning as possible are required for operations such as evaporating and reacting. The free volume of the apparatus is in this case indirectly a measure of the apparatus costs, since with a large free volume the volume of the rotors decreases in comparison with the volume which can be taken up by the product.

For those process steps which are determined by the mass exchange between a liquid phase and the gas phase, the product from the interface between these two phases and the mass-transfer coefficient are speed-determining.

In the mass exchange between gas phase and high-viscosity liquids, the main controlling factor for the mass-transfer coefficient is the frequency of the renewal of the liquid surface.

Good kinematic self-cleaning is required, moreover, to avoid the formation of deposits, in which undesired secondary reactions are favored by a long dwell time if the mixer is used as a reactor. Similarly, a regular renewal of the surfaces leads to a good mass-exchange behavior in evaporation processes, such as polycondensations for example.

These two properties are achieved to a certain extent by apparatuses known from the prior art, for example the mixers in the publications U.S. Pat. No. 5,399,012, EP 0 715 881 A2 and DE 19611852 A1.

U.S. Pat. No. 5,399,012 describes a mixing apparatus with full kinematic self-cleaning. A high degree of surface renewal is achieved by the product wiping-out motion of the scrapers. The free volume can be set to over 70%, depending on the choice of the geometry parameters (housing diameter/ axial spacing, number of scrapers).

The apparatus according to EP 0 715 881 A2 is also fully self-cleaning. Since the scrapers from U.S. Pat. No. 5,399, 012 are, however, replaced by bars with a smaller surface, the surface renewed with each revolution is smaller.

DE 19 611 852 A1 (=U.S. Pat. No. 5,876,115) has the same advantages as U.S. Pat. No. 5,399,012, but has an additional conveyance in the axial direction.

An application for such apparatuses is represented, for example, in German Offenlegungsschrift [German Published Specification] DE 19 612 139 A1.

However, in the selection of mixing apparatuses for carrying out continuous processes, the through-flowing behavior of the mixing apparatuses is also very important. In particular for carrying out polymerization reactions, apparatuses which have a low axial backmixing of the mixed substance running through are desired, since the equivalent number of agitator vessels is then increased. Depending on the desired dwell time, an active conveyance is required.

The apparatuses according to U.S. Pat. No. 5,399,012 and European Patent Application EP 0 715 881 A2 have no device for the axial conveyance of the mixed substance, but are dependent on gravity as the driving potential for the axial transport. A dwell time below 20 minutes cannot meaningfully be achieved in the case of products with a viscosity of over 10 Pas and an equivalent number of agitator vessels of greater than 5.

Extruders have a particularly good axial conveying behavior. Their disadvantage is the small free volume, as well as the low renewal of their internal surfaces in comparison with apparatuses of equal volume according to one of the apparatuses mentioned above. For commercial reasons, they can be used only for mixing processes with a dwell time of less than 3 minutes, preferably less than 1 minute.

With the apparatus known from DE 19611852 A1, or U.S. Pat. No. 5,876,115 a novel conveying mechanism was found: a chamber formed by two scrapers and a paddle, which is fastened on a shaft, is entered by a scraper of a neighboring shaft. The product is preferably forced in the direction away from the paddle. This mixer has two serious weaknesses: the product located in the chamber largely escapes through the gaps between shafts and scrapers, without being axially conveyed. In addition, half-discs are required for securing scrapers on the shaft ends. A consideration of the kinematics of this mixer leads to the realization that an axial discharge of product is not possible, since one of the half-discs always gets in the way in the region in which the axial conveyance takes place.

The object of the invention is to provide an apparatus which is kinematically fully self-cleaning, which, by virtue of good axial conveying ability, is suitable in particular for a dwell time of less than 15 minutes and, on account of a large renewed product surface with each revolution, is suitable in particular for evaporating and degassing processes in the case of viscous liquids.

This object is achieved according to the invention by a mixing apparatus for the treatment of viscous mixed substance, comprising a housing with a product inlet and a product outlet, if appropriate an exhaust vapor nozzle, two or more shafts with, located thereupon, paddles extending in the circumferential direction and blades extending along the axial direction and a drive means for the counter-rotation of neighboring shafts, characterized in that the blades are respectively connected both to one of the shafts and to a paddle, apart from the blades which, seen in the axial direction, are located at the ends of the apparatus, in that on the upstream side of each paddle there is at least one outwardly conveying blade and on the downstream side of each paddle there is at least one inwardly conveying blade, apart from the paddles which, in the axial direction, are located at the ends of the apparatus, in that, with the rotation of the shafts brought about by the drive means, the blades and paddles sweep fully over the housing and consequently fully clean it kinematically, in that, with the rotation of the shafts brought about by the drive means, the blades and paddles sweep fully over the shafts and consequently fully clean them kinematically, in that, with the rotation of the shafts brought about by the drive means, the blades and paddles of one shaft are swept over by blades and paddles of a directly neighboring shaft, by this shaft itself or by the housing inside wall and are consequently fully cleaned kinematically, in that pairs of blades following each other in the circumferential direction of a shaft and at least one paddle, (which is connected to one of the blades) form a open chamber into which, with the rotation of the shafts and, a blade located on another, neighboring shaft, in engagement, moves and thereby forces most of the product out of the open chamber in the direction opposed to the surface of the paddle.

For the following description, for the sake of simplicity, the entirety of the shaft and blades and paddles connected to the shaft is referred to as a rotor. The apparatus may have two, three, four or more rotors arranged parallel to one another, respectively neighboring rotors always rotating in contrary directions.

A major advantage of the novel mixing apparatus is its kinematic self-cleaning. Kinematic cleaning is to be understood here as the sweeping over of surfaces of one part of an apparatus by the edges or surfaces of another part of the apparatus, a play of the moving parts achievable with production tolerance taken into consideration being allowed to avoid the blocking of moving parts. The mixing apparatus is fully self-cleaning.

The upstream-directed side of a paddle is understood as meaning the side whose surface points in the direction of the inlet end of the mixer. The downstream-directed side points in the direction of the outlet end of the mixer. The conveyance of the blades outwards is understood here as meaning the conveyance radially away from the shaft in the direction of the lateral housing wall. The conveyance inwards refers to the conveying direction radially towards the shaft.

In a preferred design, all the geometrical cut edges of blades and paddles in any desired geometrical radial section through a rotor are either epicycloid portions or arcs of a circle about the rotation centre point.

Epicycloid is the curve which describes a point $$\begin{pmatrix} x_1 \\ y_1 \end{pmatrix}$$

in the system of co-ordinates of one rotor 1 with centre point $$\begin{pmatrix} a \\ 0 \end{pmatrix}$$

in the system of co-ordinates of the other rotor 2 with the centre point $$\begin{pmatrix} 0 \\ 0 \end{pmatrix}:$$

$$\begin{pmatrix} x_2 \\ y_2 \end{pmatrix} = \begin{pmatrix} \cos(\omega_2 t) & \sin(\omega_2 t) \\ -\sin(\omega_2 t) & \cos(\omega_2 t) \end{pmatrix} \cdot \left[ \begin{pmatrix} \cos(\omega_1 t) & -\sin(\omega_1 t) \\ \sin(\omega_1 t) & \cos(\omega_1 t) \end{pmatrix} \cdot \begin{pmatrix} x_1 \\ y_1 \end{pmatrix} + \begin{pmatrix} a \\ 0 \end{pmatrix} \right].$$

In this case $\omega_1$ and $\omega_2$ are the angular velocities of the rotors, and opposite operating signs of the angular velocities denote a counter-rotating system.

To generate the contour of a design of the invention with play, for the geometrical construction a circle which generates the contour and has a radius equal to the desired play can be moved along the epicycloid portion. The generated contour with play is then a curve which tangentially touches the circle during its exact movement. (cf. U.S. Pat. No. 4,556,324).

In a further preferred design, the drive means drives the shafts equally fast in absolute terms.

In another preferred design, there is in each desired geometrical radial section through the mixer only one paddle on each rotor.

In another preferred design, the ratio between housing inside diameter and axial spacing is from 1.45 to 1.70.

Suited particularly for use in extruders is a preferred configuration of the mixer in which elements which comprise a shaft sleeve, paddles connected to the sleeve and blade portions are fitted onto core shafts. Such elements may be combined as desired like conventional modular components of known extruders. It is thus possible to combine shearers or screw conveyors with the said elements.

Suited in particular for generating a high outlet pressure is a preferred configuration of the mixer according to the invention in which additional extruder screw portions are arranged on each shaft.

A preferred embodiment of the apparatus is characterized in that the shafts are composed of core shafts and shaft sleeves arranged thereon, in that some selected blades are subdivided into at least two blade sections arranged in axial succession and in that the shaft sleeves together with the paddles, optionally non-subdivided blades and blade sections form firmly connected segments.

For evaporating and degassing processes, degassing in successively lower pressure stages is frequently appropriate. Extruder screw portions may likewise serve for the separation between pressure stages. Particularly preferred is a design where, in the direction of flow, firstly an extruder screw portion with greater pitch and then a portion with lesser pitch is used. The portion with lesser pitch produces a back-pressure, which effects a sealing of the gaps with play.

The mixing apparatus is suitable for the mixing of, in particular, sensitive mixed substances of all kinds, i.e. both for the mixing of liquid chemicals or natural substances possibly containing solids as well as in particular as a reactor for any desired chemical reactions in which a short dwell time of the mixed substance and good self-cleaning of the mixer are important. The mixer is particularly suited as a reactor for reactions involving the release of volatile substances, for example for polycondensation reactions as well as for drying and evaporating processes. The mixture may also be coupled as desired with mixing, conveying and kneading apparatuses known in principle, for example with screw conveyors.

The mixing apparatus according to the invention is particularly suitable for the evaporating or degassing of volatile substances from viscous liquids with a viscosity of more than 10 Pas. In such cases, an average dwell time of less than 15 minutes in the mixing apparatus is achieved.

To obtain a larger heating or cooling surface, apart from the housing, the shafts or else, if appropriate, additionally the paddles and blades of the rotors may also be heated or cooled. This is possible, for example, by the installation of a system of internal heat-transfer-medium channels, which pass through the shafts and, if appropriate, the paddles and blades of the mixer and are flowed through by a heat transfer medium.

The invention is explained in more detail below with reference to the figures by way of example, without thereby restricting specifics of the invention.

In the drawing:

FIG. 1b shows a side view of the apparatus according to FIG. 1a

FIG. 3 shows the radial section through the apparatus according to FIG. 2 corresponding to a section A—A in FIG. 1a.

FIG. 6b shows the side view of the apparatus according to FIG. 6a.

EXAMPLES

Figure 1A:
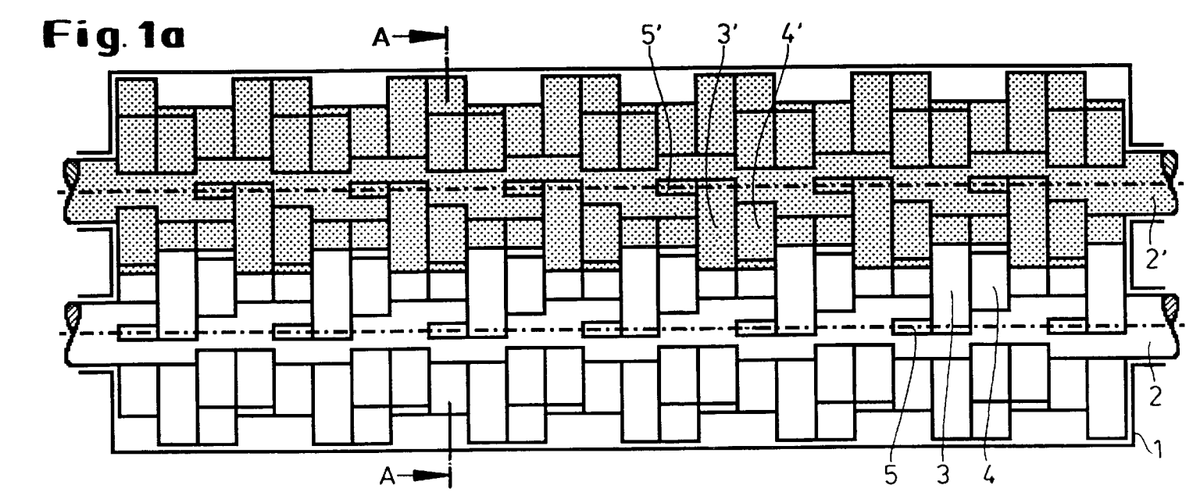
FIG. 1*a* shows the simplified schematic general representation of a design of the apparatus according to the invention with two rotors.
Figure 1B:
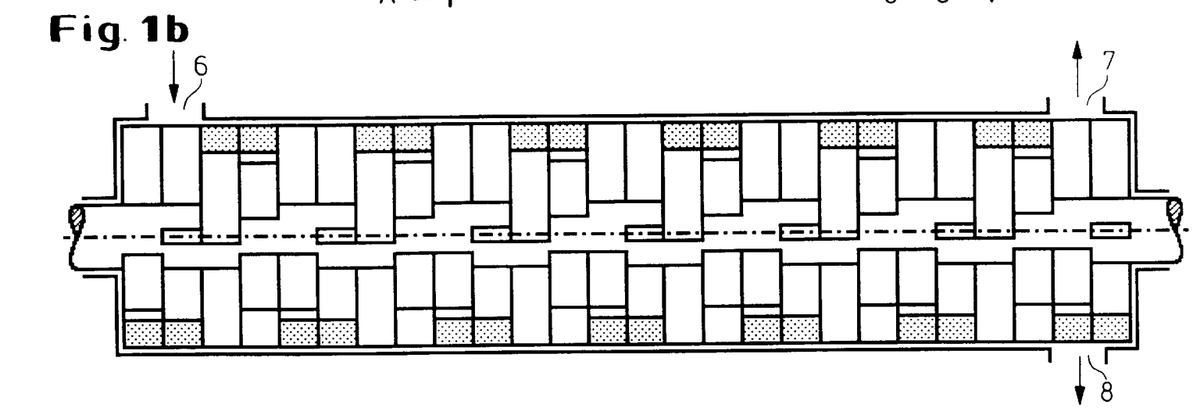

FIGS. 1a and 1b show the basic construction of a mixer according to the invention, comprising a housing 1, heatable if appropriate, with a product inlet 6 on one side and a product outlet 8 on the opposite side of the mixer and two counter-rotating shafts 2 and 2', to which paddles 3, 3' and blades 4, 4' and 5, 5' are attached. The exhaust vapor from the mixed substance, not shown, can be drawn off via the nozzle 7.

Example 1

For understanding the kinematics, radial sections of the mixer according to the invention are crucial. Correspondingly, in FIGS. 3 and 4 radial sections corresponding to the section A—A from FIG. 1 are represented.

Figure 2:
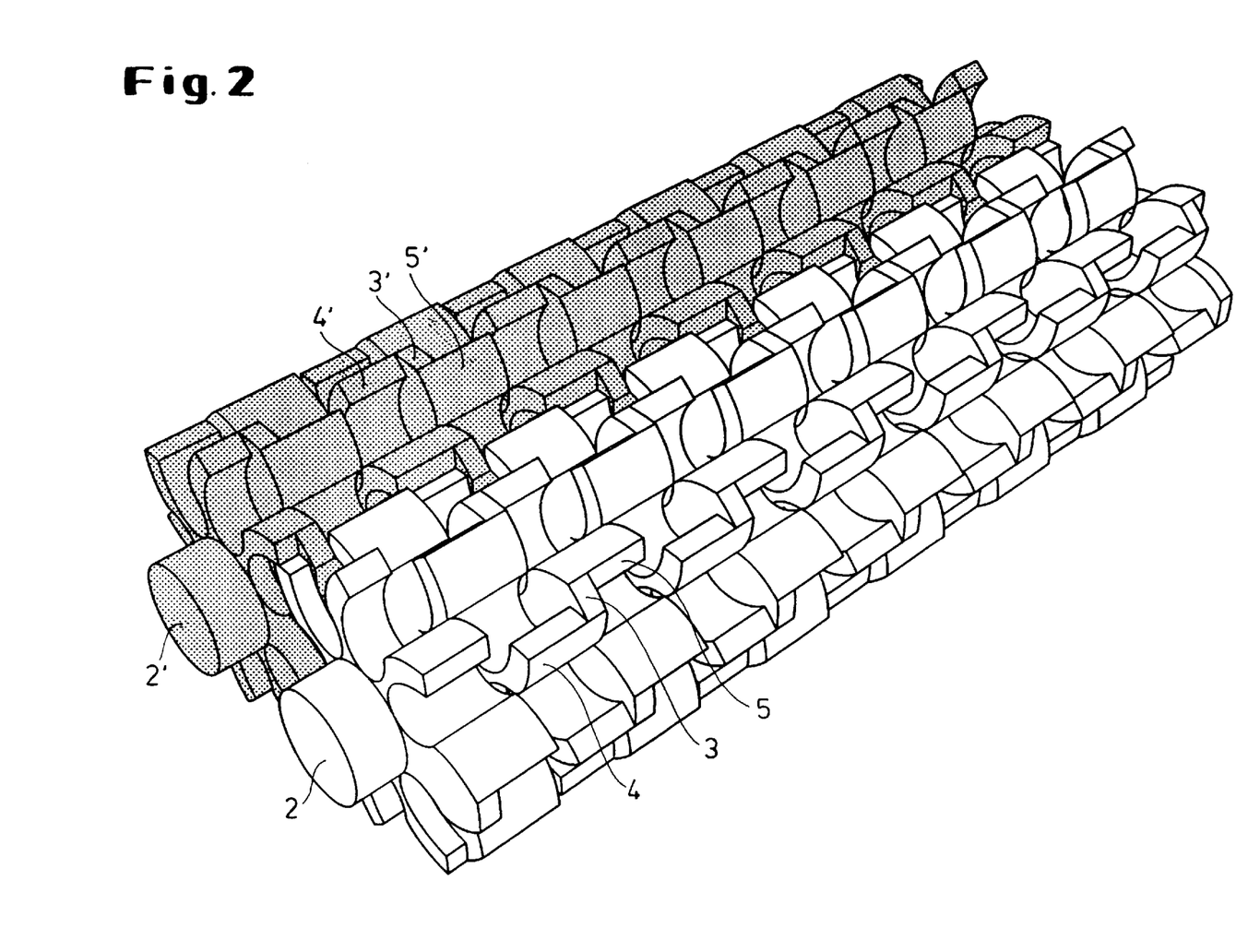
FIG. 2 shows a perspective representation of the rotors of an apparatus according to the invention. For the sake of overall clarity, the housing has not been shown.

FIG. 2 shows a perspective representation of the shafts 2, 2', blades 4, 4', 5, 5' and paddles 3, 3' of a mixer according to the invention. The housing 1 has not been shown for the sake of overall clarity. In radial sections, all the cut edges are either epicycloids, that is if the cleaning of the cut edge is performed by another edge, or circles about the rotation centre point, that is if the cleaning is performed by a surface.

The shafts 2, 2' rotate in contrary directions at the same angular velocity in absolute terms.

The blades 4, 4', 5, 5' are connected both to the shafts 2, 2' and to the paddles 3, 3'. Only at the ends of the rotors there are blades which are connected only to the shaft.

On the upstream end side of the paddles 3, 3' there is respectively an outwardly conveying blade 5, 5'. On the downstream-facing end side of the paddles 3, 3' there is respectively an inwardly conveying blade 4, 4'. Only at the ends of the rotors there are paddles which bear a blade only on one end side.

The housing 1 is fully cleaned kinematically by the blades 4, 4', 5, 5' and paddles 3, 3'.

Figure 3:
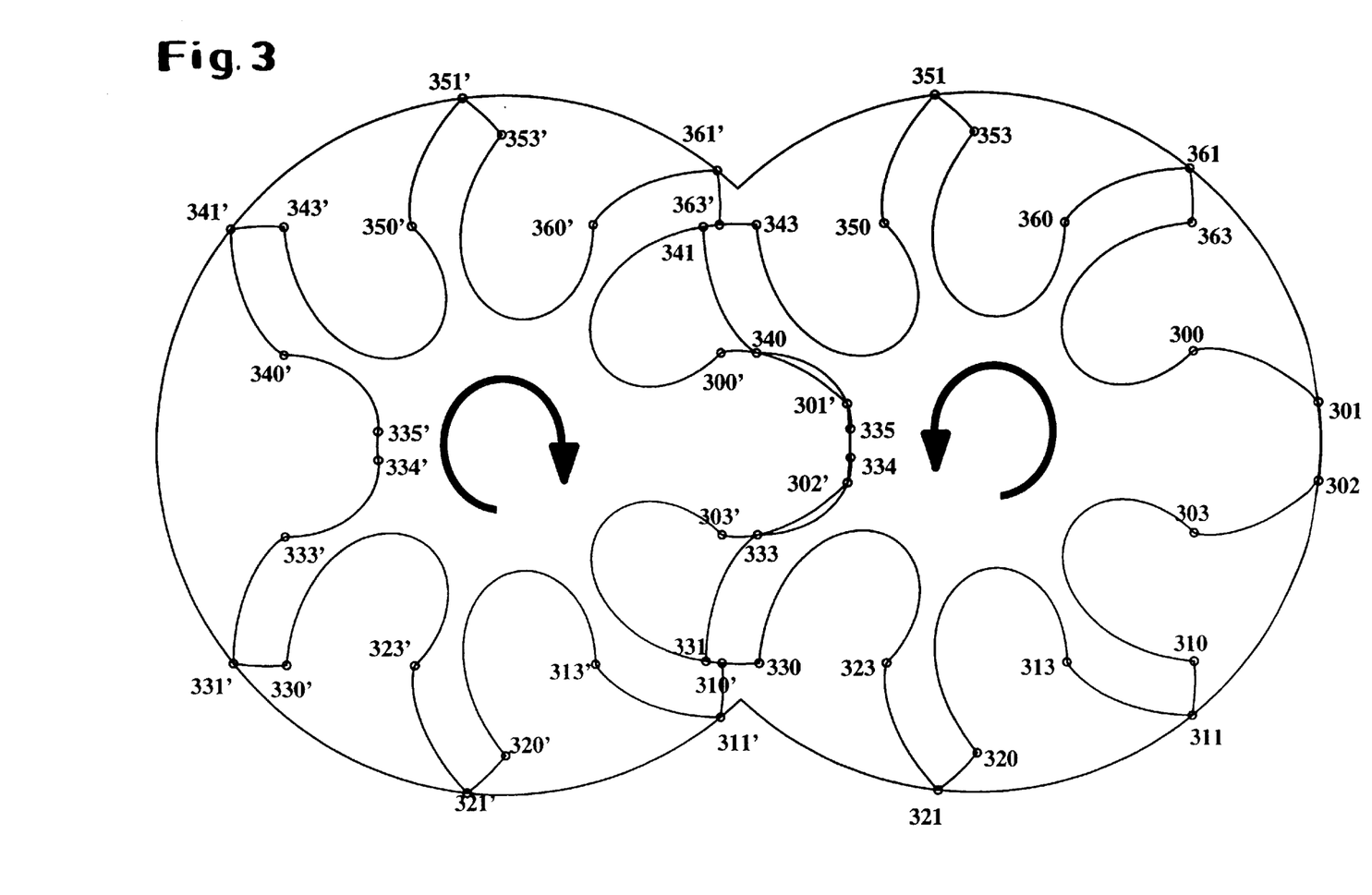

FIG. 3 shows a radial section according to line A—A in FIG. 1 through the reactor/mixer according to FIG. 2. With reference to this drawing, the mutual cleaning is to be explained:

| | |
|---|---|
| Surface 301-302 is cleaned by | surface 334'-335', |
| Surface 302-303 is cleaned by | edge 333', |
| Surface 303-310 is cleaned by | edge 331', |
| Surface 310-311 is cleaned by | edge 330', |
| Surface 311-313 is cleaned by | edge 323', |
| Surface 313-310 is cleaned by | edge 321', |
| Surface 320-321 is cleaned by | edge 320', |
| Surface 321-323 is cleaned by | edge 313', |
| Surface 323-320 is cleaned by | edge 311', |
| Surface 330-331 is cleaned by | edge 310', |
| Surface 331-333 is cleaned by | edge 303', |
| Surface 333-334 is cleaned by | edge 302', |
| Surface 334-335 is cleaned by | surface 301'-302', |
| Surface 335-340 is cleaned by | edge 301', |
| Surface 340-341 is cleaned by | edge 300', |
| Surface 341-343 is cleaned by | edge 363', |
| Surface 343-350 is cleaned by | edge 361', |
| Surface 350-351 is cleaned by | edge 360', |
| Surface 351-353 is cleaned by | edge 353', |
| Surface 353-360 is cleaned by | edge 351', |
| Surface 360-361 is cleaned by | edge 350', |
| Surface 361-363 is cleaned by | edge 343', |
| Surface 363-300 is cleaned by | edge 341', |
| Surface 300-301 is cleaned by | edge 340'. |

Figure 4:
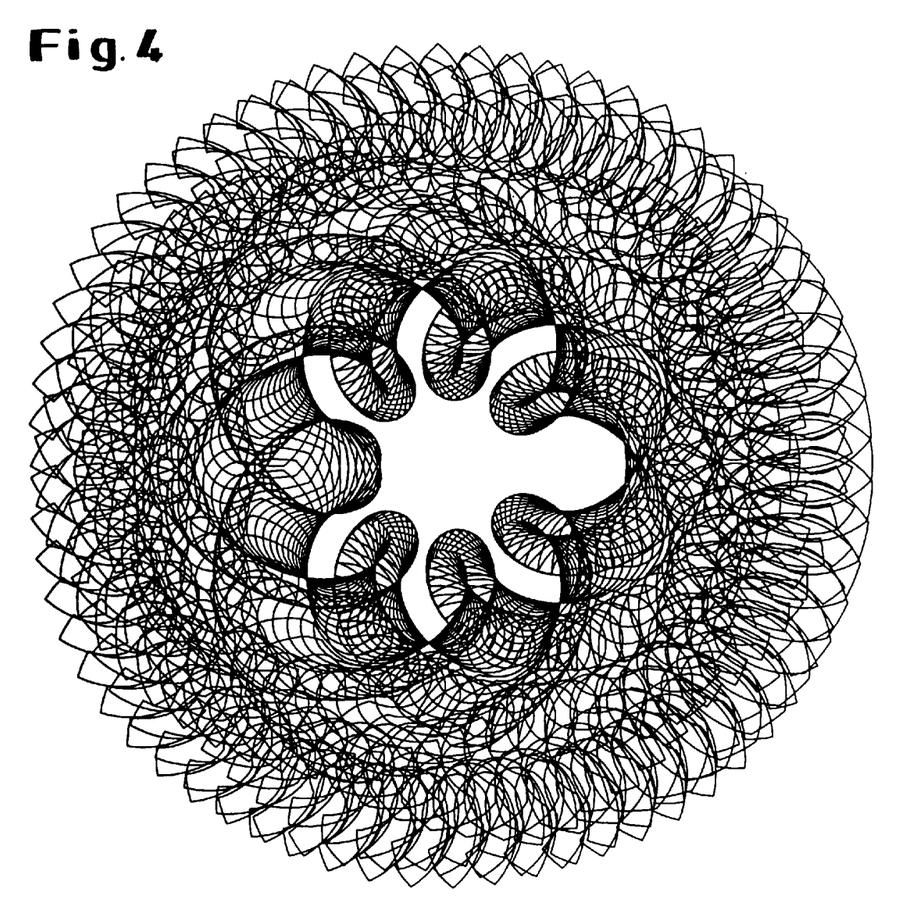
FIG. 4 shows a representation of the kinematic self-cleaning of the apparatus according to FIG. 2 corresponding to a section A—A in FIG. 1a. One rotor was kept in place, the relative movement of the other rotor with respect to this rotor was superimposed for various angles of the rotation.

FIG. 4 shows the same radial section as FIG. 3. However, one shaft was kept in place and various positions of the other shaft with the blades and paddles located thereupon during one revolution were superimposed. It is obvious that a full cleaning of the internals takes place.

Figure 5:
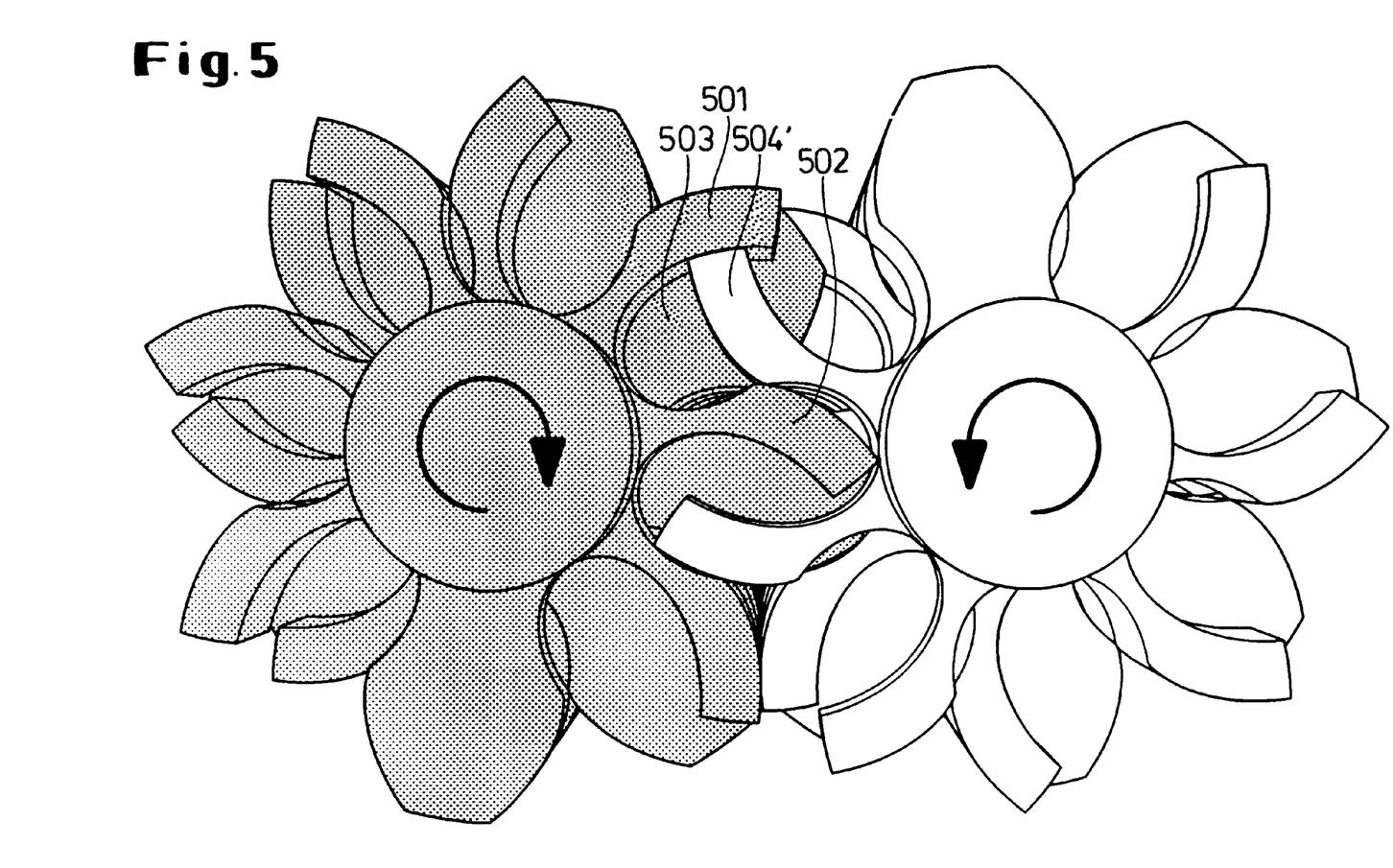
FIG. 5 shows the perspective representation of the same apparatus as in FIG. 2. To explain the axial conveyance, a view in the axial direction has been chosen.

FIG. 5 shows the same rotors as FIG. 3 but from a different perspective. It is clear that the blades 501 and 502 together with the paddle 503 form a open chamber. If, during the counter-rotation of the rotors, the blade 504' of the other rotor enters the open chamber, the product can escape only in the axial direction. A conveying action towards the viewer is thereby produced.

Example 2

Figure 6A:
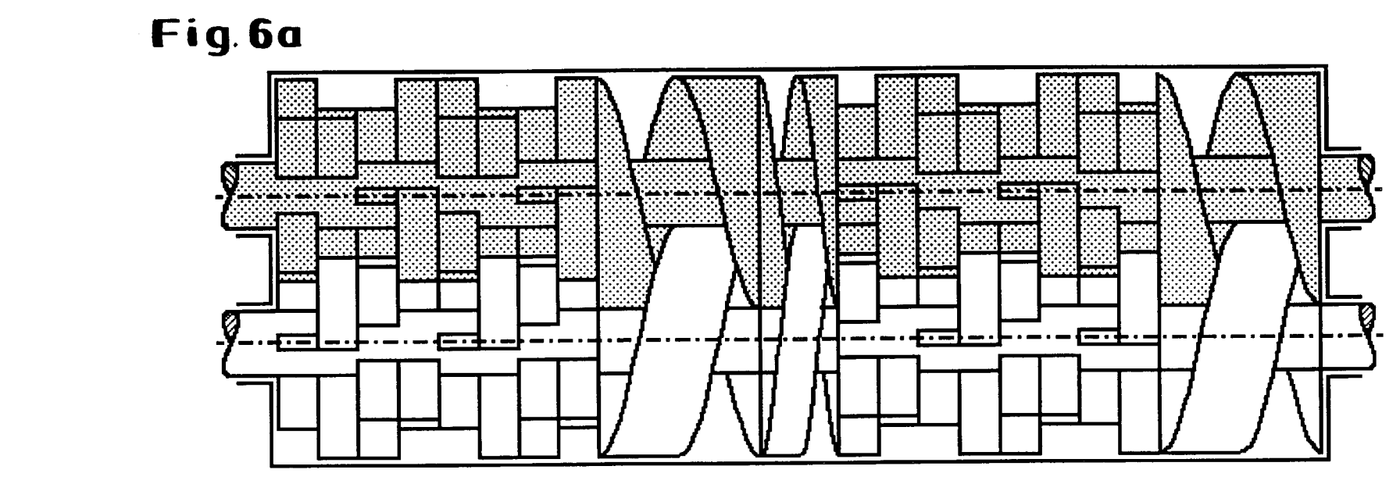
FIG. 6a shows a simplified general representation of a variant of the apparatus according to the invention in which the extruder portions serve for the separation of evaporating or degassing steps at various pressure levels and for discharge.
Figure 6B:
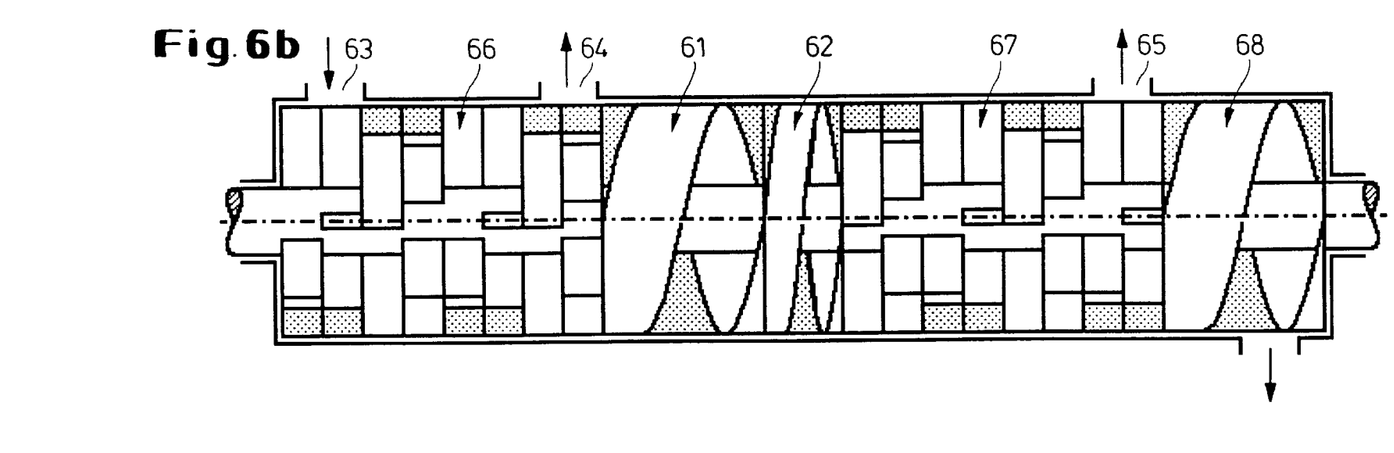

In FIG. 6, an evaporating or degassing apparatus with a plurality of pressure stages is shown. The inlet 63 is adjoined by an evaporating zone 66 with mixing elements of the geometry shown in FIG. 2, which discharges its exhaust vapors via the exhaust vapor nozzle 64. The second evaporating zone 67, with the same mixing elements, discharges its exhaust vapors via the exhaust vapor nozzle 65. The second evaporating zone 67 is operated at a lower pressure.

The evaporating zones 66; 67 are separated from each other by extruder screw portions 61 with a high pitch and extruder portions 62 with a lesser pitch. The elements 62 have the effect of producing a backpressure of the mixed substance, which leads to the effect that, in the extruder gates, product flows back through the gaps between the flight land of the screw elements 61 and the housing. This produces a reliable gas seal, which prevents exhaust vapors from passing out of the first evaporating zone 66 into the second evaporating zone 67. In particular if the second evaporating zone is operated in a vacuum, this is required in order to prevent the vacuum from breaking down.

A final extruder portion 68 generates the necessary pressure for the discharge of the product which is required for discharge through the die plate of a granulating device or for a filtration.

Example 3

Figure 7:
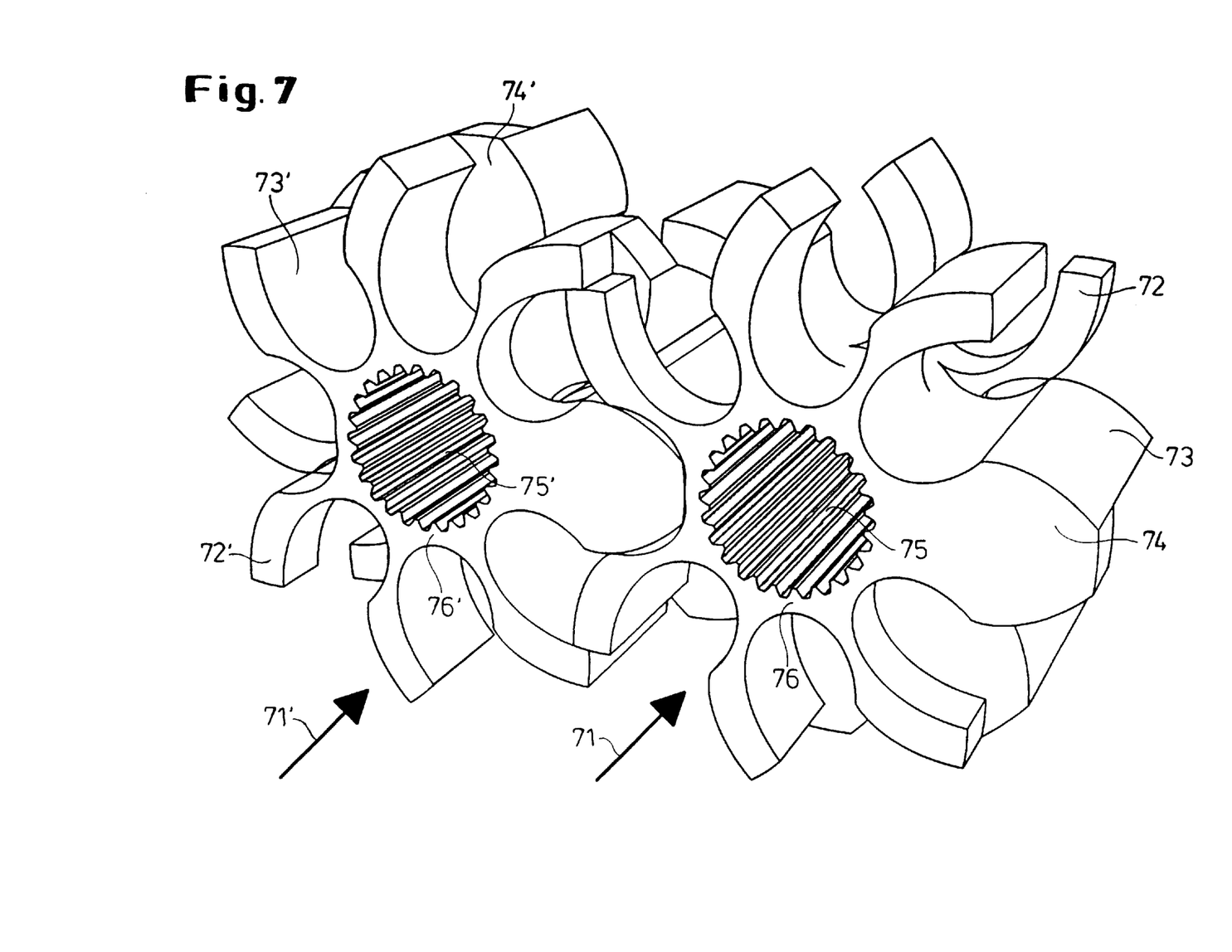
FIG. 7 shows two interlocking shaft sleeves.

FIG. 7 shows two interlocking shaft sleeves (76 and 76'). They have openings (75, 75') for receiving the core shafts.

The openings are designed in the form of toothed hubs according to DIN 5480 for receiving the torque to be transmitted.

The shaft sleeves each form a coherent unit (71, 71') comprising paddles (74, 74'), blades (73, 73') and blade sections (72, 72').

What is claimed is:

1. Mixing apparatus for the treatment of viscous mixed substance, comprising a housing (1) with a product inlet (6) and a product outlet (8), two or more shafts (2, 2') with, located thereon paddles (3, 3') extending in the circumferential direction, each of said paddles having an upstream side and a downstream side, and blades (4, 4', 5, 5') extending along the axial direction, and a drive means for the counter-rotation of neighboring shafts (2, 2'), wherein the blades (4, 4', 5, 5') are respectively connected both to one of the shafts (2, 2') and to a paddle (3, 3'), except for the blades at the axial ends of the apparatus, which are not connected to paddles, and wherein on the upstream side of each paddle (3, 3') there is at least one outwardly conveying blade (5, 5') and on the downstream side of each paddle (3, 3') there is at least one inwardly conveying blade (4, 4'), except for the paddles which are located at the axial ends of the apparatus, and wherein, with the rotation of the shafts brought about by the drive means, the blades (4, 4', 5, 5') and paddles (3, 3') sweep fully over the inside wall of the housing (1) and consequently fully clean it kinematically, and wherein, with the rotation of the shafts brought about by the drive means, the blades (4, 4', 5, 5') and paddles (3, 3') sweep fully over the shafts (2, 2') and consequently fully clean them kinematically, and wherein, with the rotation of the shafts (2, 2') brought about by the drive means, the blades (4, 5) and paddles (3) of one shaft (2) are swept over by blades (4', 5') and paddles (3') of a directly neighboring shaft (2'), by the shaft (2') itself or by the housing inside wall and are consequently cleaned kinematically, and wherein pairs of blades (501, 502) following each other in the circumferential direction of a shaft (2) and at least one paddle (503) which is connected to one of the blades form a chamber into which, with the rotation of the shafts (2) and (2'), a blade (504') located on another, neighboring shaft (2'), in engagement, moves and thereby forces most of the product out of the chamber in the direction opposed to the surface of the paddle (503).

2. Apparatus according to claim 1, wherein, in any radial section taken perpendicular to the shaft axis through the apparatus, the blades (4, 4', 5, 5') and paddles (3, 3') include sections which are respectively either portions of arcs of a circle about their respective rotation center points or epicycloid portions.

3. Apparatus according to claim 1, wherein the drive means drives shafts (2, 2') equally fast in absolute terms.

4. Apparatus according to claim 1, wherein the ratio of the inside diameter of the housing to the distance between centers of adjacent shafts is from 1.45 to 1.7.

5. Apparatus according to claim 1, wherein there is in any section taken perpendicular to the shaft axis through the mixer only one paddle (3, 3') on each shaft (2, 2').

6. Apparatus according to claim 1, wherein the shafts are composed of core shafts and shaft sleeves arranged thereon, and wherein some selected blades are subdivided into at least two blade sections arranged in axial succession wherein the shaft sleeves together with the paddles and any non-subdivided blades and blade sections form firmly connected segments.

7. Apparatus according to claim 1, wherein each shaft (2, 2') additionally has extruder screw portions, (61, 62) and (61', 62') respectively.

8. Apparatus according to claim 7, wherein said extruder screw portions separate the apparatus into individual process stages and screw portion comprise a first screw part (61) and a second screw part (62), one of said screw parts having a greater pitch than the other whereby, in operation, the screw part with the greater pitch is arranged ahead the other screw part in the direction of flow.

9. Process for the evaporating or degassing of volatile substances from viscous liquids using an apparatus according to claim 1 with a viscosity of the liquid of more than 10 Pas and with an average dwell time of the mixed substance of less than 15 minutes.

10. The mixing apparatus of claim 1, further comprising an exhaust vapor nozzle (7).

* * * * *